United States Patent [19]

Jones

[11] Patent Number: 4,938,454

[45] Date of Patent: Jul. 3, 1990

[54] CHAIN HOIST WITH AUTOMATIC BRAKE AND DOUBLE CHAIN HOOKS

[75] Inventor: Lewis M. Jones, Greenwood, Miss.

[73] Assignee: Maurice Jones, Brandon, Mich. ; a part interest

[21] Appl. No.: 727,797

[22] Filed: Apr. 26, 1985

[51] Int. Cl.[5] .......................... B66D 3/16; B66D 5/08; F16D 63/00

[52] U.S. Cl. .................................... 254/356; 188/82.2; 188/82.34; 188/134; 254/378

[58] Field of Search ............... 254/356, 375, 378, 222; 188/82.2, 82.3, 82.34, 134

[56] References Cited

U.S. PATENT DOCUMENTS

| | | | |
|---|---|---|---|
| 1,142,908 | 6/1915 | Preator | 254/217 |
| 1,877,408 | 9/1932 | Launder et al. | 254/378 X |
| 1,878,333 | 9/1932 | Scott | 188/82.3 |
| 1,942,534 | 1/1934 | Burghardt | 254/378 X |
| 1,990,163 | 2/1935 | Blackburn et al. | 254/343 |
| 1,993,744 | 3/1935 | Morison | 254/358 |
| 2,569,108 | 9/1951 | Koch | 192/45 X |
| 2,881,873 | 4/1959 | Movick | 188/134 |
| 3,054,597 | 9/1962 | Morrow | 254/220 |
| 3,252,189 | 5/1966 | Kanneworff et al. | 24/71.3 |
| 3,333,821 | 8/1967 | Pohl et al. | 254/276 X |
| 3,414,095 | 12/1968 | Kalns | 188/134 X |
| 3,554,337 | 1/1971 | Denkowski | 192/71 X |

FOREIGN PATENT DOCUMENTS

| | | | |
|---|---|---|---|
| 569317 | 11/1957 | Italy | 254/356 |
| 591339 | 4/1959 | Italy | 254/356 |
| 510011 | 7/1939 | United Kingdom | 254/356 |

*Primary Examiner*—Joseph J. Hail, III

*Attorney, Agent, or Firm*—Fleit, Jacobson, Cohn, Price, Holman & Stern

[57] ABSTRACT

A pair of axially aligned input and output shafts are jornalled from a frame supporting a brake drum about the output shaft and the output shaft mounts two pairs of diametrically opposite brake shoes therefrom spring biased into friction braking relation with the inner surfaces of the drum. One pair of brake shoes are of the self-energizing type to brake the output shaft against rotation in one direction relative to the drum and the other pair of shoes are of the self-energizing type for frictionally braking the shaft against rotation in the other direction relative to the drum. Connecting structure is provided establishing a limited loss motion connection between the shafts and includes control structure to release one pair of the brake shoes responsive to torque input to the input shaft above a predetermined minimum in the first direction and to release the other pair of brake shoes responsive to an equal amount of torque input to the input shaft in the opposite direction. Further, brake release structure is provided for shifting all of the brake shoes toward release positions thereof only when torque loading on the output shaft in either direction is below a predetermined low value.

8 Claims, 3 Drawing Sheets

CHAIN HOIST WITH AUTOMATIC BRAKE AND DOUBLE CHAIN HOOKS

BACKGROUND OF THE INVENTION

1. Field of the Invention

The instant invention relates to an improved portable chain hoist including a load lifting chain passed over a supporting sprocket therefor and including a pair of depending load supportable ends. Journalled torque input and torque output shafts are provided with the output shaft drivingly coupled to the sprocket and brake structure is operatively associated with the output shaft for braking the latter in both directions of rotation. Torque transfer structure drivingly connects the input shaft to the output shaft through a lost motion connection and is operative to release the brake structure upon the input of rotary torque to the input shaft above a predetermined minimum.

2. Description of Related Art

Various different forms of hoist structures and winch structures provided with automatic brakes as well as other brake structures including some of the general structural and operational features of the instant invention are disclosed in U.S. Pat. Nos. 1,142,908, 1,877,408, 1,942,534, 1,990,163, 1,993,744, 2,569,108, 3,054,597, 3,252,189, 3,333,821 and 3,554,337. However, these previously known structures do not include the overall combination of operational features of the instant invention which result in a portable chain hoist or the like including automatic brake structure as well as a manually operable brake release operable only when the hoist is free of a supported load of any magnitude.

SUMMARY OF THE INVENTION

The chain hoist of the instant invention comprises a portable hoist and may be used efficiently and with complete safety to raise and lower a load. In addition, the hoist is constructed in a manner whereby a load may be transferred from one location to another by utilizing lifting or tension forces alternately on the opposite free ends of the lifting chain of the hoist.

The hoist includes automatic brake structure which is of the self-energizing type and includes brake shoes which are both spring biased and wedge actuated for unfailing reliability.

The main object of this invention is to provide a portable chain hoist incorporating an automatic brake structure.

Another object of this invention is to provide a portable chain hoist which may be used to transfer a load from one location to another.

Still another important object of this invention is to provide a chain hoist including a brake release mechanism to allow "free wheeling" of the lift chain portion of the hoist only when the lift chain is free of a load supported therefrom.

A further object of this invention is to provide a chain hoist which is highly portable.

Yet another important object of this invention is to provide a portable chain hoist of the manually actuatable type, but which could be readily modified to be power actuated.

A final object of this invention to be specifically enumerated herein is to provide a chain hoist in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
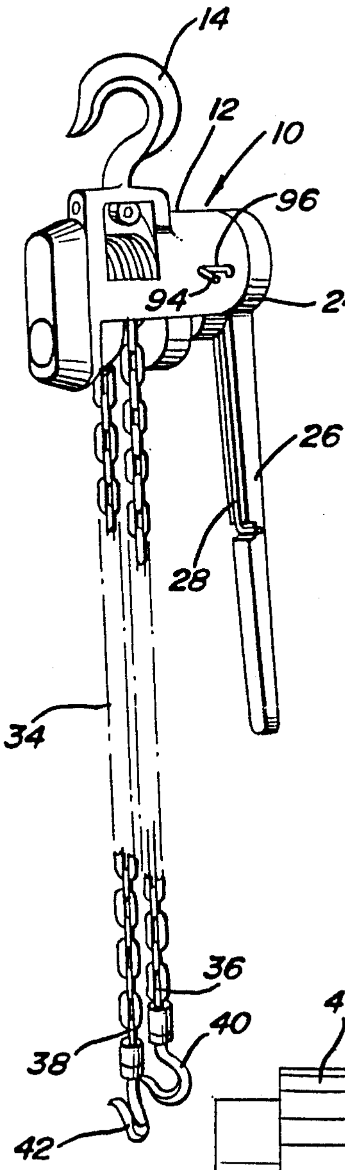
FIG. 1 is a perspective view of the chain hoist of the instant invention.
Figure 2:
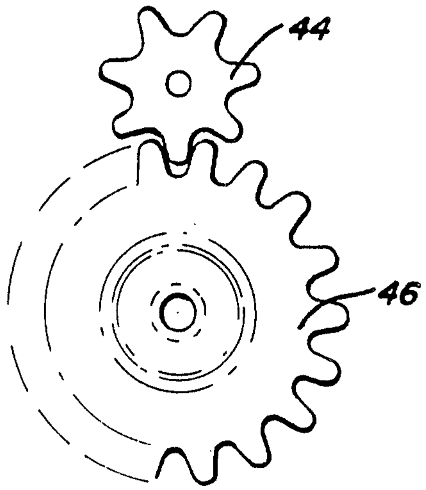
FIG. 2 is an enlarged fragmentary end elevational view of the chain hoist internal reduction gear assembly.

Referring now more specifically to the drawings, the numeral 10 generally designates the chain hoist of the instant invention. The chain hoist 10 includes a support frame or outer housing 12 from which anchor means in the form of a pivotally mounted hook 14 is supported. The frame or housing 12 rotatably journals axially aligned first and second input and output shafts 16 and 18 therefrom through the utilization of any suitable forms of bearings (not shown) and the end of the input shaft 16 adjacent the output shaft 18 supports a torque transfer unit 20 therefrom including a central recess 23 in which the adjacent end of the output shaft 18 is rotatably received. Further, the end of the input shaft 16 remote from the output shaft 18 removably supports a ratchet gear 22 therefrom with which the base end 24 of an operating handle or lever 26 is operatively engaged in any well known manner. The base end 24 is oscillatably supported from the frame or housing 18 and includes a ratchet reversing actuator (not shown) under the control of a control rod 28 extending outward along the lever or handle 26 for manual shifting between limit positions angularly displaced approximately 180° apart.

The frame or housing 12 also journals the combined chain sprocket and load shaft 30 therefrom through the utilization of any suitable form of bearings (not shown) and the shaft 30 includes a chain sprocket portion 32 about which a link chain section 34 is trained. The link chain section 34 includes opposite end portions 36 and 38 equipped with load supporting elements such as hooks 40 and 42, respectively. The shaft 18 includes a gear wheel 44 thereon meshed with a larger diameter gear wheel 46 carried by the shaft 30.

A brake drum 48 is mounted within the housing 12 by an integral mounting flange 50 and the shaft 18 supports a load locking plate or block therefrom against rotation relative thereto. The load locking block 52 is disposed within the drum 48 and supports two pairs of brake shoes 54 and 56 therefrom with the brake shoes of each pair being disposed on diametrically opposite sides of the shaft 18. Compression springs 60 bias the shoes 54 in one direction and compression springs 62 bias the brake shoes 56 in the opposite direction. In addition, each of the brake shoes 54 and 56 includes an arcuate wedge surface 64 engaged with a corresponding roller 66 rotatably mounted from an adjacent portion of the block 52 and an expansion spring 68 is connected between each shoe 54 and 56 and the adjacent portion of the block 52.

The block 52 defines a pair of diametrically opposite axially extending notches 70 and the torque transfer unit 20 includes a pair of axially extending arms 72 loosely received in the notches 70 and provided with opposite side grooves 74 in which end caps 76 carried by the shoes 54 and 56 are received. In addition, a brake release actuator plate 78 is slidable on the input shaft 16 and a compression spring 80 is disposed about the shaft 16 between the torque transfer unit 20 and the plate 78. The plate 78 includes four brake release pins 82 which extend in a direction paralleling the shaft 16 and the free ends of the pins 82 are bevelled as at 84 and project slightly into the grooves 74 whereby the plate 78 is keyed or splined to the torque transfer unit 20 and thus relative to the shaft 16 against rotation relative thereto.

Figure 3:
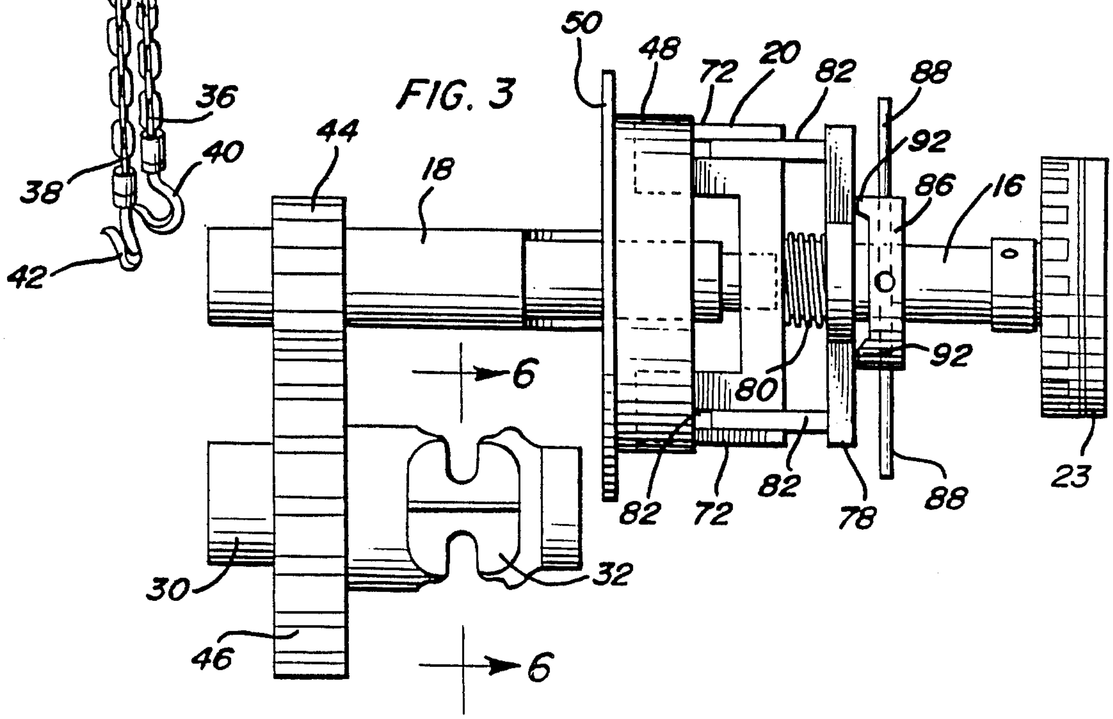
FIG. 3 is a side elevational view of the internal working components of the chain hoist.

A brake release lever 86 is pivotally mounted within the frame 12 by pivot pin portions 88 and loosely embraces the shaft 16. The furcations 90 of the lever 86 include abutments 92 for abutting engagement with the side of the plate 78 opposite from the side thereof from which the pins 82 project and the lever 86 includes a small diameter control arm 94 which projects outwardly through a slot 96 formed in the housing 12 and in whose opposite ends the free end of the control arm 94 may be seated. When the control arm 94 is seated in the left end of the slot 96 as illustrated in FIG. 1 of the drawings, the brake release lever 86 is in the inactive position, but when the arm 94 is seated in the right end of the slot 96, the brake release lever is in the active position with the abutments 92 thereof engaged with the plate 78 and displacing the latter to the left as viewed in FIG. 3 of the drawings whereupon the bevelled ends of the pins 72 will engage the end caps 76 to shift all of the shoes 54 and 56 in directions against the biasing action of the springs 60 and 62.

In operation, the link chain section 34 is passed over the sprocket wheel 32 and either end of the section 34 may be used to support a load. Then, upon oscillation of the handle 26 in the appropriate manner that load may be raised or lowered, depending upon the setting of the ratchet mechanism (not shown). Whenever the low minimum input torque is applied to the lever in opposition to the load supported by the loading engaging end of the section 34, the springs 60 and 62 as well as the cam surfaces 64 and rollers 66 serve to frictionally engage the brake shoes 54 and 56 with the interior surfaces of the drum 48 and to thus prevent rotation of the output shaft 18 and thus the shaft 30. It will be noted, from FIG. 4, that the shoes 54 are of the self-energizing type when the shaft 18 tends to rotate in a clockwise direction and that the shoes 56 are of the self-energizing type when the shaft 18 tends to rotate in a counterclockwise direction.

Figures 4, 5:
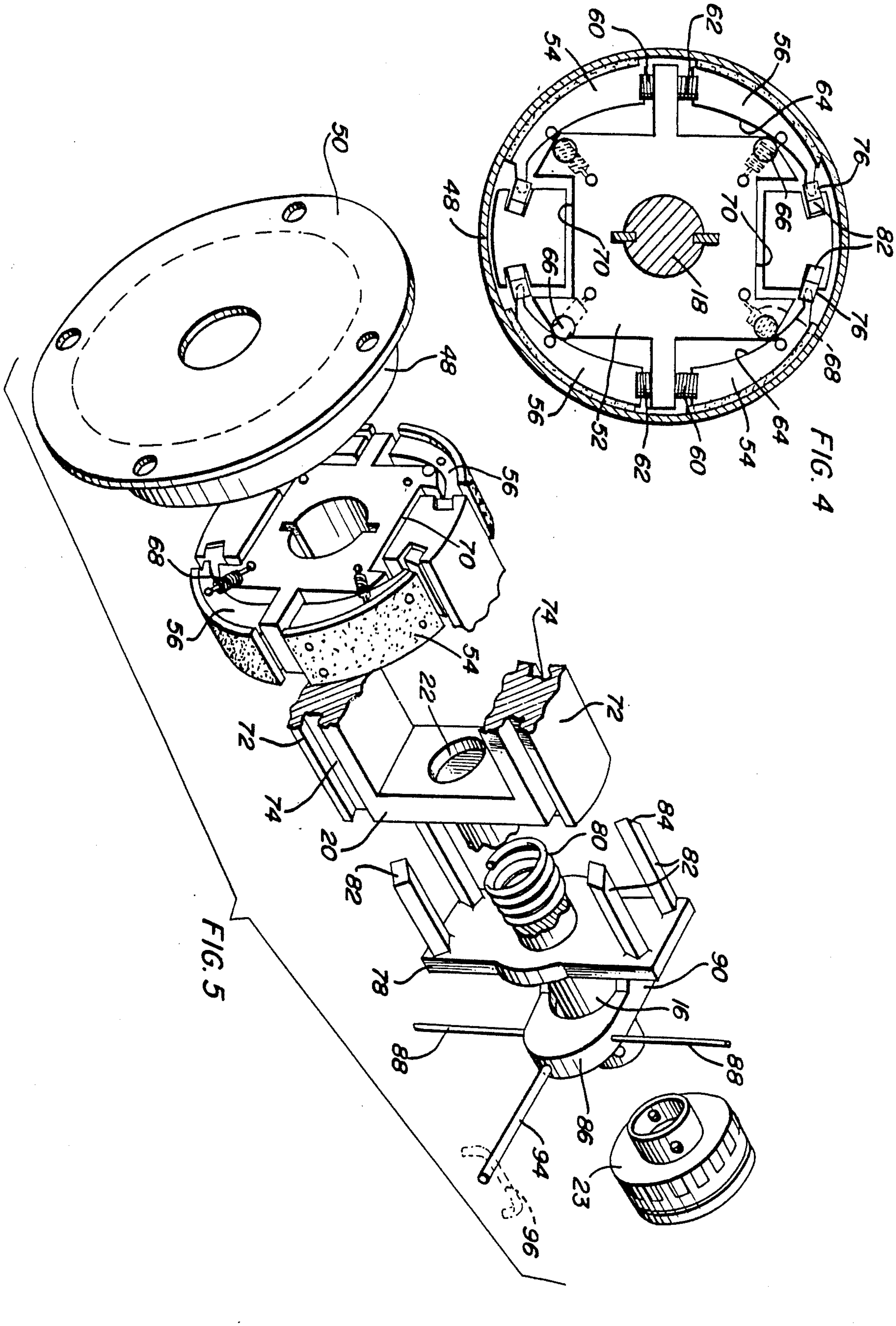
FIG. 4 is an enlarged transverse vertical sectional view of the brake assembly components of the chain hoist.
FIG. 5 is a fragmentary exploded perspective view of the internal working components of the chain hoist.
Figure 6:
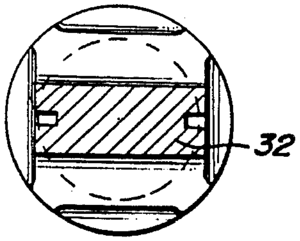
FIG. 6 is an enlarged vertical sectional view taken substantially upon the plane indicated by the section line 6—6 of FIG. 3.
Figure 7:
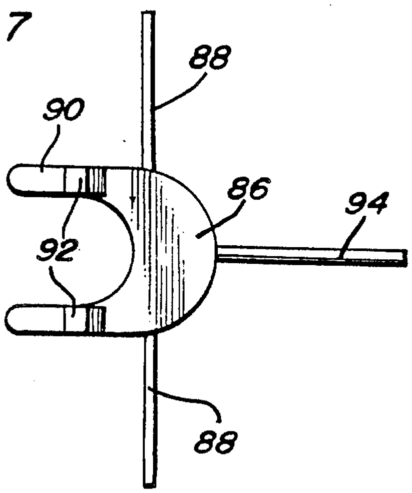
FIG. 7 is an enlarged end elevational view of the brake release actuating mechanism.

However, when the lever or handle 26 is used to impart above minimum rotational torque to the shaft 18 in a clockwise direction as viewed in FIG. 4, the arms 72 cock slightly in the notches 70 and, before engaging the opposing wall of the notches 70, engage the end caps 76 to displace the shoes 54 in a clockwise direction relative to the block 52 and thus release the brake shoes 54 which were only lightly applied. The springs 68 engage with the shoes 54 tend to inwardly retract the latter away from the drum 48 and continued rotation of the unit 20 in a clockwise direction then allows the arms 72 to engage the opposing extremities of the notches 70 to thus displace rollers 66 engaged with the shoes 56 downwardly along the ramp surfaces 64 of the shoes 56 and to release shoes 56. Of course, by this time the rotary torque applied to the lever or handle 26 is equivalent to that necessary to suspend the load carried by the corresponding end of the chain section 43 and the load may be raised as desired.

In addition, the lever or handle 26 may be operated to turn the shaft 18 in a counterclockwise direction. In such instance rotation of the unit 20 in a counterclockwise direction will cause the arms 72 to engage the end caps 76 carried by the shoes 56 and thereby displace the shoes 56 from their fully applied braking positions and the load being supported may be lowered. Also, it will be readily understood that the above described raising and lowering of a load supported from the chain section 34 may be accomplished independent of which end portion of the chain section 34 the load is supported from.

Figure 8:
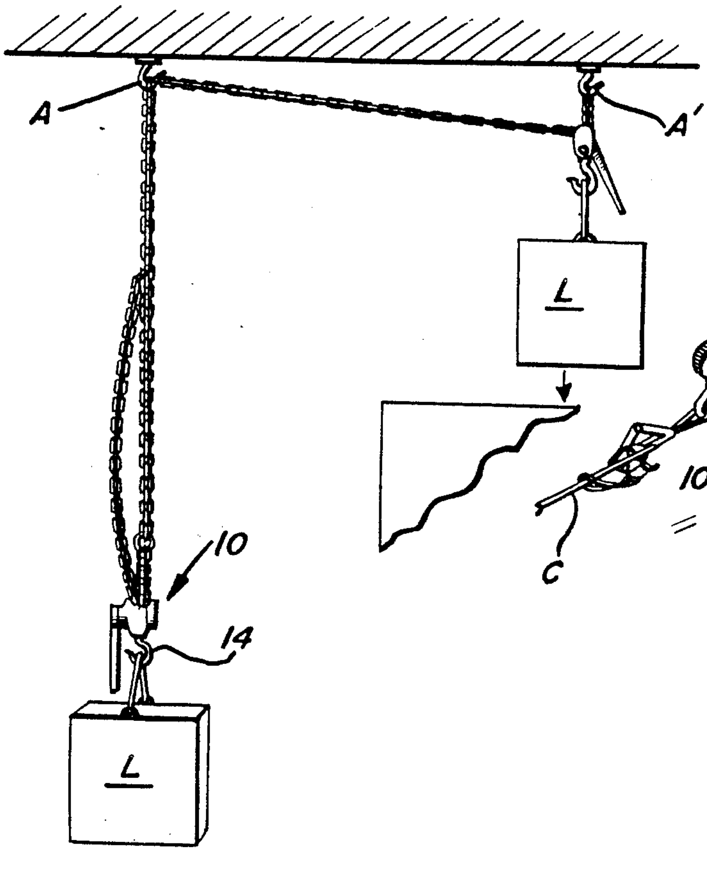
FIGS. 8 and 9 are perspective views illustrating two different manners in which the chain hoist may be used.

With attention now invited more specifically to FIG. 8 of the drawings, it may be seen that the hoist 10 may be inverted relative to the position thereof illustrated in FIG. 1 with the hook 14 engaged with a load L and that the hoist 10 may first be used to raise the load 12 toward an anchor A by one end portion of the chain section 34 and thereafter shifted horizontally toward a second anchor A' through utilization of the other end portion of the link chain section 34.

Figure 9:
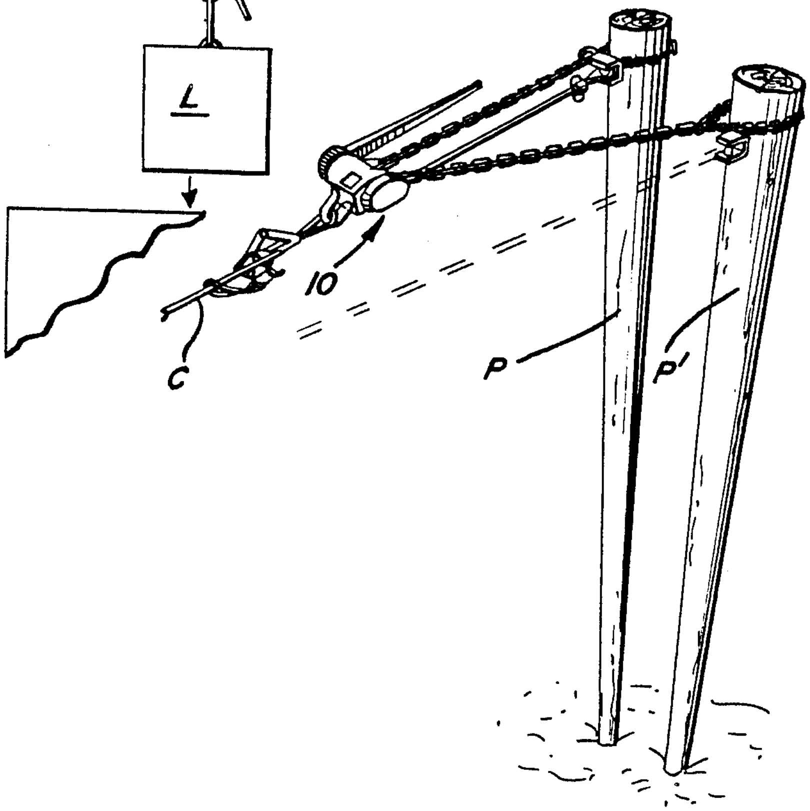

Still further, FIG. 9 illustrates the manner in which a cable C may have one end thereof transferred from a first upright post P to a second upright post P' in somewhat the same manner in which the hoist 10 was used in FIG. 8 to initially raise the load L toward the anchor A and to thereafter more the load L toward the anchor A'.

Also, as stated previously, when the control arm 94 is shifted toward the right end of slot 96, the brake mechanism is released, but the resistance to flexure of the arm 96 is controlled such that the arm 96 will flex when under the increased force required to release the brake mechanism when either end of the chain section 34 is supporting more than a minimum load. Accordingly, the brake release control arm can only be actuated to release the brake mechanism when there is substantially no load being supported by either chain section end.

The foregoing is considered as illustrative of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A chain hoist including a support frame, rotatable input and output shafts journalled from said frame, stationary drum means mounted from said frame, first and second self-energizing wedge-type brake shoe means shiftably mounted from said output shaft for movement between applied and release positions and including first and second spring means, respectively, yieldingly biasing said first and second brake shoe means to the applied positions thereof for friction braking of said output shaft relative to said drum to prevent rotation of said output shaft relative to said drum in first and second opposite directions, respectively, a torque input member mounted on said input shaft for rotation therewith, connecting means drivingly coupling said input and output shafts for rotation of each by the other in opposite directions of rotation thereof, said connecting means including means establishing a limited loss motion connection between said shafts and control means operative to release said first and second brake shoe means responsive to torque input from said input shaft through said connecting means and to said output shaft above a predetermined minimum in said second and first directions of rotation, respectively, said control means also including abutment means engageable with said second and first brake shoe means for shifting said second and first brake shoe means to the release positions thereof against the biasing action of said second and first spring means responsive to said torque input to said connecting means from said input shaft in said second and first directions, respectively, during the take up of the lost motion in said connection as a result of rotation of said input shaft in said second and first directions, respectively, relative to said output shaft.

2. The hoist of claim 1 wherein said first and second brake shoe means each comprise a pair of brake shoe structures disposed on generally diametrically opposite sides of the axis of rotation of said output shaft.

3. The hoist of claim 1 wherein said frame includes anchor means for anchoring said frame relative to a stationary structure.

4. The hoist of claim 1 wherein said frame defines a substantially closed housing in which said shafts are journalled.

5. The hoist of claim 4 wherein said shafts are coaxial.

6. A chain hoist including a support frame, rotatable input and output shafts journalled from said frame, stationary drum means mounted from said frame, first and second self-energizing wedge-type brake shoe means shiftably mounted from said output shaft for movement between applied and release positions and including first and second spring means, respectively, yieldingly biasing said first and second brake shoe means to the applied positions thereof for friction braking of said output shaft relative to said drum to prevent rotation of said output relative to said drum in first and second opposite directions, respectively, a torque input member mounted on said input shaft for rotation therewith, connecting means drivingly coupling said input and output shafts for rotation of each by the other in opposite directions of rotation thereof, said connecting means including means establishing a limited loss motion connection between said shafts and control means operative to release said first and second brake shoe means responsive to torque input from said input shaft through said connecting means and to said output shaft above a predetermined minimum in said second and first directions of rotation, respectively, said control means also including abutment means engageable with said second and first brake shoe means for shifting said second and first brake shoe means to the release positions thereof against the biasing action of said second and first spring means responsive to said torque input to said connecting means from said input shaft in said second and first directions, respectively, during the take up of the lost motion in said connection as a result of rotation of said input shaft in said second and first directions, respectively, relative to said output shaft, said first and second brake shoe means each comprising a pair of brake shoe structures disposed on generally diametrically opposite sides of the axis of rotation of said output shaft, brake release means shiftably mounted from said frame for movement between active and inactive positions and operatively associated with said brake shoe means for shifting all of the brake shoe means toward their release positions only when torque loading on said input shaft in either direction is below a predetermined low value.

7. A chain hoist including a support frame, rotatable input and output shafts journalled from said frame, stationary drum means mounted from said frame, first and second self-energizing wedge-type brake shoe means shiftably mounted from said output shaft for movement between applied and release positions and including first and second spring means, respectively, yieldingly biasing said first and second brake shoe means to the applied positions thereof for friction braking of said output shaft relative to said drum to prevent rotation of said output relative to said drum in first and second opposite directions, respectively, a torque input member mounted on said input shaft for rotation therewith, connecting means drivingly coupling said input and output shafts for rotation of each by the other in opposite directions of rotation thereof, said connecting means including means establishing a limited loss motion connection between said shafts and control means operative to release said first and second brake shoe means responsive to torque input from said input shaft through said connecting means and to said output shaft above a predetermined minimum in said second and first directions of rotation, respectively, said control means also including abutment means engageable with said second and first brake shoe means for shifting said second and first brake shoe means to the release positions thereof against the biasing action of said second and first spring means responsive to said torque input to said connecting means from said input shaft in said second and first directions, respectively, during the take up of the lost motion in said connection as a result of rotation of said input shaft in said second and first directions, respectively, relative to said output shaft, brake release means shiftably mounted from said frame for movement between active and inactive positions and operatively associated with said brake shoe means for shifting all of the brake shope means toward their release positions only when torque loading on said input shaft in either direction is below a predetermined low value.

8. The hoist of claim 7 wherein said frame includes anchor means for anchoring said frame relative to a stationary structure.

* * * * *